May 10, 1960     E. WILDHABER     2,935,887
ENVELOPING WORM GEARING
Filed Nov. 12, 1957

INVENTOR:
Ernest Wildhaber

United States Patent Office 2,935,887
Patented May 10, 1960

2,935,887

ENVELOPING WORM GEARING

Ernest Wildhaber, Brighton, N.Y.

Application November 12, 1957, Serial No. 695,623

12 Claims. (Cl. 74—458)

The present invention relates to enveloping worm gearing, wherein an hourglass or throated worm engages and partially envelops a wormgear. Because the wormgear generally has a root surface of concave axial profile and envelops the worm, such worm gearing is sometimes called double-enveloping.

The present application relates to an invention which is in the same general field as my application "Enveloping Worm Gearing," Serial No. 682,804, filed September 9, 1957. It has been commonly assumed that in conventional Cone or Hindley worm gearing the tooth contact is in the midplane of the wormgear and extends through the entire length of the worm. Applicant has demonstrated mathematically, however, that the tooth contact, which carries the load, follows a diagonal path. In the Cone or Hindley enveloping worm gearing this path crosses the center line of the worm gearing; and the point where this path crosses the center line is one end of the path of tooth contact. Applicant has demonstrated mathematically that at this point in the midplane of the wormgear the contacting tooth surfaces are almost counter-parts of one another.

It is at this point, however, in the Cone or Hindley type worm gearing that the mating tooth surfaces start to intersect and interfere with one another. They intersect at small angles which vary along the length of the worm. The only reason that the tooth surfaces of the Cone or Hindley worm and wormgear do not interfere with one another beyond the midplane is because the interfering portions are automatically cut away in the production of the wormgear; for it is the conventional practice to hob the wormgear with a hob essentially like the worm; and such a hob will automatically produce wormgear teeth that will mesh with a worm, that corresponds to the hob, without interference with the thread of the worm. Nevertheless, because the interfering tooth portions are cut away the tooth contact ceases at the midplane in the conventional Cone or Hindley type worm gearing. At most, therefore, only half the length of the wormgear teeth will be in contact during operation. This limits the load-carrying capacity of such gearing and affects its life.

Other known types of enveloping worm gearing are either difficult and expensive to produce, and/or also are limited in their load-carrying capacity and life.

One object of the present invention is to device a new tooth shape with improved characteristics, such as longer duration of contact and increased load capacity. A further object is to provide additional design possibilities, so that in each case a best solution is available from a wider selection.

Other aims will appear in the course of the specification and in the recital of the appended claims.

In my prior application Serial No. 682,804 above-mentioned, maximum intimacy of tooth contact and maximum load capacity are achieved by starting out from an interference line. This interference line or intersection line of the mating tooth surfaces is placed in a favorable position on the wormgear tooth surface; and greater load-carrying capacity and longer life are achieved in the gearing by staying as close as possible to this interference line. In the present application the interference line is placed on the worm thread instead of on the wormgear tooth surfaces; and the tooth shape is so determined that this interference line stays in the same position on the worm thread at all turning angles of the worm and wormgear. In this way again I stay as close to interference as possible, and secure maximum intimacy of tooth contact. This inversion of placing the interference line on the worm thread instead of on the wormgear tooth surface has a special significance where worms are used which have relatively large lead angles. For worms of relatively large lead angles the useful path of contact in a Cone or Hindley worm is at such a large inclination to the direction of the worm axis that the duration of contact is relatively short and few threads are in contact simultaneously. This large inclination also exists in the case of my companion application Serial No. 682,804. As will be demonstrated mathematically in the present application the inversion here described cuts down this inclination drastically and provides much longer contact with more teeth in simultaneous contact in the case of worm drives of relatively large lead angle. The present application, therefore, remedies a limitation found in the gearing of my prior application Serial No. 682,804, and provides advantages over the prior art in the field of high lead angle enveloping worms and gears.

Figure 5:
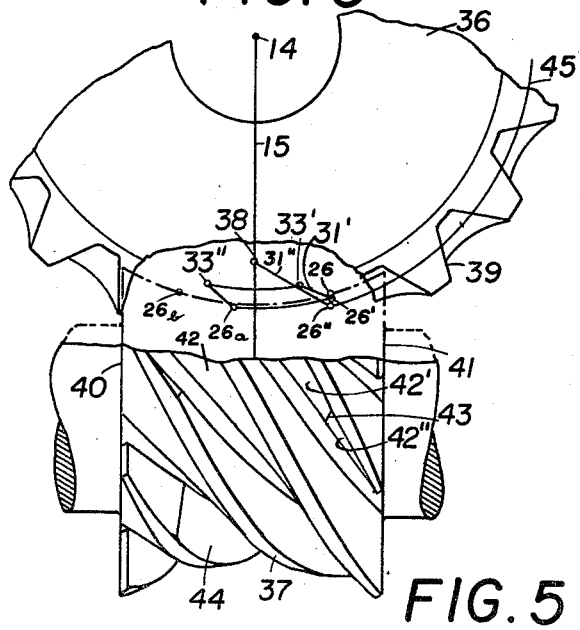
Fig. 5 is a front elevational view and partly a diagram of a worm and wormgear corresponding to Figures 3 and 4, looking along the wormgear axis. The wormgear is shown fragmentarily.
Figure 6:
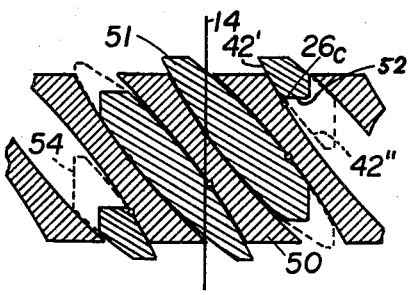

Fig. 6 is a fragmentary development to a plane of a cylindrical section coaxial with the wormgear. It illustrates an embodiment slightly modified from the one shown in Figures 3 to 5. The cylindrical section extends along lines such as 45 in Figures 4 and 5.

Throated worm 11 with axis 12 meshes with a wormgear 13 rotatably mounted on an axis 14 here shown at right angles to the worm axis 12. Numeral 15 denotes the center line, which intersects both axes 12, 14 at right angles, as known.

A wormgear and its fully conjuate worm contact along a line or several lines at any one turning position, on each of the two sides of the teeth. In operation a line of contact sweeps the working surface of a tooth and describes a surface in space. This surface of action may intersect the center line 15 at a point 16. Point 16 is a point of contact in the considered turning position.

In my above-named application it has been shown that the tooth contact at point 16 of the center line is potentially most intimate and most valuable, but that this most intimate contact also invites tooth interference.

Interference or intersection of tooth surfaces which should merely contact is difficult and laborious to determine. Moreover generally the interference line moves on a tooth surface as the gears turn. According to my inventions new tooth shapes are provided which, if they produce interference, at least keep interference at the same place in all turning positions. The interference line is then a fixed part of the tooth surface; and interference will not reach beyond this line. It is under control. By staying close to interference, but outside of it, the most intimate tooth contact possible is attained. It approaches surface contact.

The interference line is assumed on a tooth surface with the given directions; and it is then a relatively simple matter to determine the mesh, the surface of action therefrom, and the tooth surfaces themselves. In the above-named application the interference line is assumed on a wormgear tooth. A gear-tooth side is then generally composed of a working portion and of a relieved portion smaller than the working portion. The latter has no contact in any actual running position.

With the present invention the interference line is assumed on the worm thread.

Figure 1:
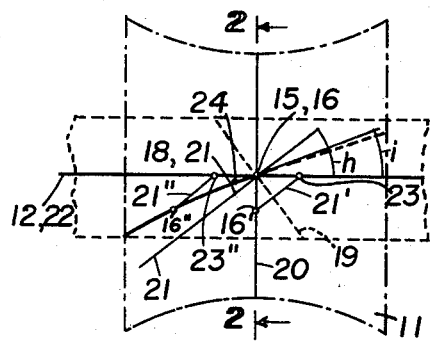
Fig. 1 is a diagrammatic plan view of a worm and wormgear constructed according to an embodiment of the invention that is most readily explained, the view being taken at right angles to the axes of the worm and wormgear.
Figure 2:
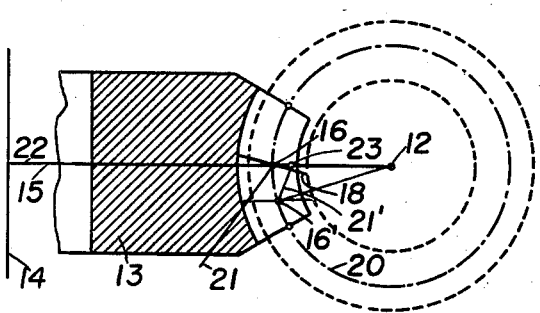
Fig. 2 is a diagrammatic section taken along lines 2—2 of Fig. 1, looking in the direction of the arrows, and a view along the worm axis.

In the embodiment of Figures 1 and 2 it is assumed as a line 18 that passes through point 16 of the center line 15. Line 18 may have any desired direction. It is shown straight, but may also be curved.

As worm 11 turns on its axis 12, point 16 describes an arc of a circle 20 and line 18 describes in space a surface of revolution about axis 12. Simultaneously the wormgear 13 turns on its own axis 14, at the ratio of the numbers of teeth of the worm and wormgear, as if the wormgear and worm would run in engagement with each other. Line 18 thereby describes and traces a tooth side on the wormgear. The produced tooth side of the wormgear is the relative path of line 18. Point 16 describes a mean line therein. It can be considered a pitch line in a pitch surface of the wormgear obtained by rotating arc 20 about the wormgear axis 14.

To establish the mesh between the defined tooth surface of the wormgear and the mating worm, the surface normals have to be determined, in known manner. At any point 16' of circular arc 20 the tooth tangent plane produced on the wormgear is the plane connecting the describing line 18 (or its tangent at 16') with the known direction of relative motion at 16'. This direction is also the tangent to the pitch line 19 described by the moving point 16. The surface normal 21' at 16' is perpendicular to the thus established tangent plane. 21 denotes the surface normal at mean point 16.

It is sufficient to consider one side of the teeth, the one with normals 21, 21'. The opposite side is identical therewith, and can be placed into the same position by turning the worm 11 around about center line 15 through half a turn.

Normal 21' intersects the axial plane 22 of the worm at a point 23. Plane 22 contains the center line 15 as well as the worm axis 12. Normal 21' is known to have leverages with respect to the wormgear axis and worm axis in proportion of the respective numbers of teeth of the wormgear and worm, as the wormgear tooth surface is the relative path of a line (18) of the worm. That is, a given force acting along normal 21' exerts turning moments on the wormgear and worm in the proportion of their tooth numbers.

The turning moment exerted on the worm depends on the distance of point 23 from the worm axis 12 and on the inclination of normal 21' to axial plane 22. This inclination remains constant when normal 21' is turned about the wormgear axis 14. As it is so turned, point 23 moves in a circular arc about axis 14. At a position 23'' (Fig. 1), on the opposite side of center line 15 and equally distant therefrom as point 23, it has the same distance from the worm axis 12 as in position 23. Normal 21' is then in a position 21'' which again fulfills the kinematic requirement of contact. Its leverages with respect to the axis 14 and 12 are in the proportion of the numbers of teeth of the wormgear and worm. Tooth surface point 16' of normal 21' then moves to a position 16''.

This is the position of tooth contact, provided that the worm is shaped to be conjugate to the defined wormgear tooth surfaces. In other words, tangential tooth contact and proper tooth action can exist at point 16'', while point 16' is a point of potential intersection or interference of the given tooth surface of the wormgear with the tooth surface or thread surface of the conjugate worm. Actual interference is avoided by removing the interfering portions of the worm thread.

Other corresponding points 16', 16'' are similarly determined after assuming a different turning angle 16—12—16' (Fig. 2). Point 16 and the various points 16'' define the path of contact 24 on the assumed pitch surface of the wormgear, and the mean path of tooth action.

In addition to point 16, further points of the describing line 18 may be considered. When any such other point is rotated about the worm axis 12 it describes a circle of different diameter than circle 20. Again we may consider a surface of revolution obtained by rotating the circular arc about the axis of the wormgear. The path of contact in this surface of revolution may then be determined as already described for the pitch surface, by obtaining first the surface normals and from them the points of contact. In this way the entire surface of action may be made up from the paths of contact in surfaces of revolution coaxial with the wormgear.

It has been shown in the above-named application that in the immediate vicinity of the pitch point (16), on center line 15, mating teeth have surface contact, that is, the convex portion has equal curvature as the concave portion it contacts, and that on one side of the pitch point (16) the curvatures are overmatched so that interference occurs, unless relief is provided on the interfering portion. This part of the path of contact is shown in dotted lines. While it fulfills the kinematic conditions of contact, it is useless for actual contact. The full-line portion of path 24 however provides excellent tooth contact, which is increasingly intimate the closer the considered portion is to pitch point 16.

From the above geometrical construction the inclination $i$ of path 24 at point 16 can be computed. It is the inclination of its tangent to the direction of the worm axis 12. When $h$ denotes the helix angle of the gear teeth at pitch point 16, or also the inclination of the projected normal 21 to the worm axis 12, the following formula can be obtained with the known procedures of mathematics:

$$\tan i = \tfrac{1}{2} \tan h$$

Inclination $i$ is therefore substantially smaller than the helix angle $h$, about half as large.

Ways of producing the worm will be described hereafter.

Figure 3:
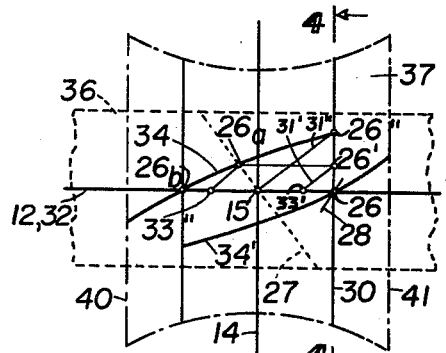
Fig. 3 is a plan view similar to Fig. 1, but referring to a modification with longer duration of contact between the worm and wormgear.
Figure 4:
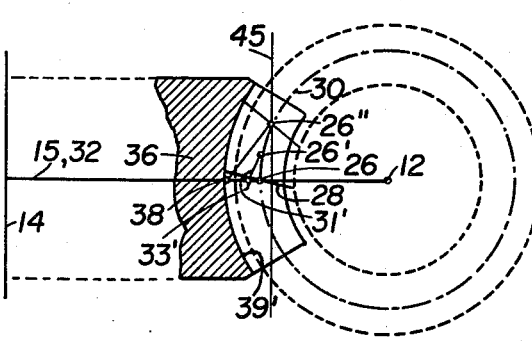
Fig. 4 is a section taken along lines 4—4 of Fig. 3, looking in the direction of the arrows, and a view along the worm axis.

The embodiment illustrated in Figures 3 to 5 attains an increased duration of contact by offsetting the assumed interference and describing line from the center line 15 of the gear pair.

Line 28 is offset in the direction of decreasing inclination of the thread surface to the direction of center line 15. A tooth surface 39 of the wormgear 36 is described by line 28 on the rotating wormgear, when line 28 is rotated on the worm axis 12 at the ratio of the numbers of teeth of the wormgear 36 and worm 37, that is when it is rotated as if the worm would mesh with the wormgear. The tooth side 39 is the relative path of line 28 on the rotating wormgear. Line 28 may have any suitable direction, and may be straight or curved. The tooth bottom 29' follows the tooth sides, and has a concave profile in an axial section of the wormgear (Fig. 4).

As line 28 rotates on the worm axis 12, its mean point 26 describes a circle 30. A pitch surface or reference surface is attained on the wormgear by rotating an arc of circle 30 about the wormgear axis. To construct the path of contact in this pitch surface, various positions 26', 26" of point 26 are considered, as point 26 with line 28 turns about the worm axis. Again the surface normals of the described gear-tooth surface are determined. They are perpendicular to the respective tooth tangent planes. These contain line 28 or its tangent and the direction of relative motion, that is the tangent to the pitch line described on the gear pitch surface. The direction of relative motion at any considered point (26') may be determined in known manner by vectorial addition of the turning velocities about the worm axis 12 and about the wormgear axis 14, at said point.

The surface normal 31' at point 26' intersects the axial plane 32 of the worm at a point 33'. The position of useful contact is obtained by turning normal 31' about the wormgear axis 14 until point 33' reaches a position 33" on the opposite side of and at the same distance from center line 15 as position 33'. Points 33" and 33' then have the same distance from worm axis 12. Point 26' thereby moves with the normal to the position of contact 26a.

The surface normal 31" at a point 26" intersects the center line 15, at a point 38. This then is the sole contact position of normal 31". And 26" is the point of contact. It can be demonstrated mathematically that this point corresponds in effect to point 16 of Figures 1 and 2. In the region very close to this point the contacting surfaces match completely. In mathematical language, in all sections through point 26" the contacting convex and concave profiles have the same curvature. Point 26" is also the end point of the actual path of contact.

Point 26 lies in the axial plane 32 itself. Its position 26b of useful contact is at the opposite side of center line 15 at an equal distance therefrom.

The path of contact 34 is the line containing the points 26b, 26" and the various points 26a which may be determined. It reaches from end 40 of the worm 37 to point 26", and provides a long duration of contact. At each point (26a) it is less inclined to the direction of the worm axis 12 than the pitch line 27 (which represents the direction of the tooth surface) is inclined to the direction of the wormgear axis.

The load capacity is high, as the contact is long and intimate. Its intimacy increases towards point 26".

Further lines of the surface of action may be determined as described above, by considering further points of the describing line 28, in addition to point 26.

To avoid actual interference adjacent end 41 of the thread surface 42, the thread surface is relieved at that end. That is the interfering portions of the thread surface are removed. As shown in Fig. 5 a thread surface 42 consists of a working portion 42' and a relieved portion 42" smaller than the working portion. The latter has no tooth contact in any actual running position. It joins and intersects portion 42' in a ridge 43 and stands back from the extended thread surface 42' just enough to avoid interfering contact, or more if desired. Preferably the two portions 42', 42" intersect at an angle which differs from 180 degrees by less than ten degrees.

The opposite thread surface 44 is identical with the thread surface 42, and may be brought into the same position by turning the worm about center line 15 through half a turn. 34' (Fig. 3) is its path of contact in the considered pitch surface of the wormgear. This thread side is relieved adjacent end 40 of the worm.

The mean path of contact 34 or 34' and the surface of action bypass the center line 15 of the wormgear pair 36, 37. They bypass it on the side of increased inclination of the thread side to the direction of center line 15. This inclination changes with the turning position.

It should be noted that the teeth of the wormgear follow pitch lines such as 27 (Fig. 3) and are inclined to the direction of the wormgear axis 14. Also the various positions of the describing line (28, 18) as well as the described gear tooth surfaces themselves have inclinations to the direction of the wormgear axis (14) that change lengthwise of the teeth.

The surface of action and the mean path of contact are inclined longitudinally to the direction of the worm axis (12) at an angle smaller than the helix angle of the wormgear teeth; that is smaller than the inclination of the pitch line (27, 19) to the direction of the wormgear axis (14).

As the side surfaces 39 turn on axis 14, their general inclination to the direction of the worm axis 12 changes, as does their inclination to planes perpendicular to the worm axis. Similarly the inclination of a thread side 42 to planes perpendicular to the worm axis changes. It decreases from left to right in Figures 3 and 5, from end 40 to point 26" of the mean path of contact 34.

Normal 26a—33" (Fig. 3) is offset from center line 15. The surface normals at the contact points of path 34 have a varying offset from center line 15. The offset decreases towards point 26", where it is zero. It decreases with decreasing inclination of the thread sides to planes perpendicular to the worm axis.

A development to a plane, of a cylindrical surface coaxial with the wormgear is shown in Fig. 6. The sectional surface may be the same as cylindrical surface 45 indicated in Figures 4 and 5. Fig. 6 however shows a slight modification as compared with the embodiment of Figures 3 to 5, insofar as the worm is shortened so that no relief is required on the threaded sides.

Because the sectional surface is coaxial with the wormgear, the sectional profiles of the wormgear teeth 50 are identical on the several teeth. Their contact points with the worm threads 51 are indicated by small circles. Numeral 14 denotes the projected wormgear axis. Point 26c of Fig. 6 corresponds to point 26" of Figures 3 to 5. It is the end point of the path of contact in the sectional surface, the point where interference might start. Interference is avoided by a conventional chamfer 52 adjacent point 26c. This chamfer removes the thread portions which would otherwise interfere.

Dotted lines 54 show the thread ends of the worm shown in Figures 3 to 5, for comparison. This longer worm requires relieved surface portions 42", but has increased contact adjacent end 40.

While I have described fully conjugate wormgear pairs where the tooth contact sweeps the entire working surfaces, it is understood that the teeth or threads may be somewhat eased off at their boundaries in accordance with known practice. This is to render them less sensitive to slight inaccuracies in the shape and in the mounting, and to small deflections under load.

*Production*

The exact and fully conjugate shape of the worm thread may be produced in a hobbing operation, where the hob represents the wormgear. If desired, the worm may be roughed out in the conventional way of roughing throated worms, with a cutting tool having as many identical cutting teeth as are teeth in the wormgear. These cutting teeth are spaced around the hob periphery, in a circle.

For finishing however a hob is required whose cutting edges in the aggregate cover the entire tooth side of the wormgear. The cutting edges that represent one side of the teeth correspond to different turning positions of the describing line (28, Fig. 4) about the worm axis (12), enough of them to represent the entire side.

One or more cutting edges are provided per wormgear tooth. They are all staggered, so that each has a different turning position about the worm axis. When a single cutting edge is provided per wormgear tooth, a tooth side of the wormgear will be defined and represented by as many cutting edges as are teeth in the wormgear. This is usually sufficient to produce a good finish. To insure that each of these differently positioned cutting edges acts on each thread, the number of threads of the worm should be prime to tthe number of teeth of the wormgear.

If desired a shaving tool may be used for finishing the form.

The worm is finished-hobbed by running it together with the hob representing the wormgear, as if the worm and wormgear would mesh and run with each other. Depthwise feed to full-depth position is provided in customary manner. If desired, the two sides of the threads may be finished successively while providing sidewise feed by changing the timing, as is known. To effect ease-off, the conventional slight modifications may be made.

*Further embodiments and production methods*

It has been shown above how the path of contact may be determined starting out from a constant interference line or intersection line on a thread surface. It is however not important that this line be exactly constant, as long as it does not reach beyond a set limit, and provided that conjugacy is not impaired.

Thus we may also start out from a path of contact and surface of action that conform to the above determined requirements. In my application "Gearing," filed November 1, 1955, Serial No. 544,270, a tooth shape for worm gearing is disclosed that permits form-cutting, and where the tooth shape can be described and cut on both the worm and wormgear by a pair of counterpart cutting edges that move in a helix along the path of contact, while the worm and wormgear rotate in timed relation. The helical surface thus described in space by said counterpart cutting edges constitutes the surface of action between the worm and wormgear. According to the present invention it is so determined as to follow approximately the above determined path of contact, 34 and 34' for opposite sides of the teeth. Both the work and the wormgear may be finished by this process. A roughing cut may precede the finishing operation. The relief, if needed, can be applied in a separate operation.

This serves only as an example of how the problem can be approached by starting out from a suitable path of contact and surface of action.

In doing so, the following characteristics should be retained:

(1) Like path 34 the assumed mean path of contact is less inclined to the direction of the worm axis than the mean inclination of the wormgear teeth to the direction of the wormgear axis, about half as much.

(2) Like path 34 the assumed mean path of contact should preferably bypass the center line (15) of the wormgear pair.

(3) The tooth surface normals at the points of contact have a varying distance from the center line (15) of the gearing, a distance that decreases with decreasing inclination of the thread sides to planes perpendicular to the worm axis.

(4) The path of contact ends where the tooth surface normal intersects the center line (15). And the thread surface of the worm should be relieved or terminated to avoid interference starting at said end.

While the invention has been described in connection with several different embodiments thereof, it is capable of further modification, and this application is intended to cover any variations, uses, or adaptations of the invention following, in general, the principles of the invention and including such departures from the present disclosure as come within known or customary practice in the art to which the invention pertains and as may be applied to the essential features herein-before set forth and as fall within the scope of the invention or the limits of the appended claims.

I claim:

1. Enveloping worm gearing comprising a wormgear having a root surface of concave axial profile and a throated worm conjugate thereto, said worm having a changing profile in the mid-plane of the worm gear, the teeth of said wormgear being longitudinally inclined to the direction of its axis and having side surfaces meshing with the worm in a single surface of action of tangential tooth contact that extends diagonally over the gear face and that is generally inclined at an angle to the direction of the worm axis, said angle being smaller than the mean longitudinal inclination of said teeth to the direction of the wormgear axis, and said surface of action being inclined to the same side of the teeth of said worm gear at all points in said surface of action.

2. Enveloping worm gearing according to claim 1, wherein the mean path of contact of said surface of action bypasses the center line of the wormgear pair, and wherein the lead angle of the worm at its mean throat radius is at least fifteen degrees.

3. Enveloping worm gearing according to claim 1, wherein each thread side of the worm has a varying inclination to planes perpendicular to its axis, and wherein the surface normals at points of the mean path of contact have varying distances from the center line of the wormgear pair, said distances decreasing with decreasing inclination.

4. Enveloping worm gearing according to claim 3, wherein said distance is approximately zero at one end of said path of contact and wherein the lead angle of the worm at its mean throat radius is at least fifteen degrees.

5. Enveloping worm gearing comprising a throated worm and a wormgear having a root surface of concave axial profile, the teeth of said wormgear being inclined to the direction of its axis and having side surfaces whose inclination thereto changes lengthwise of the teeth, each of said side surfaces of the wormgear being a surface of single configuration, said worm being formed conjugate to said wormgear to transmit uniform motion between them, the side of a worm thread containing a working portion of changing inclination to planes perpendicular to its axis and a relieved portion free of tooth contact in any actual running position, said two portions intersecting in a near-ridge at an angle differing from 180 degrees by less than ten degrees.

6. Enveloping worm gearing according to claim 5, wherein said relieved portion of the thread side joins the working portion in a region offset from a central plane perpendicular to the worm axis toward its end of least inclination to planes perpendicular to the worm axis.

7. Enveloping worm gearing according to claim 6, wherein opposite sides of a worm thread have their relieved portions adjacent opposite ends of the worm.

8. Enveloping worm gearing comprising a throated worm and a wormgear having a root surface of concave axial profile, said worm having a changing profile in the midplane of the worm gear, the teeth of said wormgear having side surfaces of constant profile, said profile having a varying inclination to the direction of the wormgear axis and said side surfaces being such as may be described on the rotating wormgear by rotating said profile on an axis offset from and angularly disposed to the wormgear axis in time with the rotation of the wormgear on its axis, and said worm being formed conjugate to said wormgear to transmit uniform motion between them.

9. Enveloping worm gearing according to claim 8, wherein said side surfaces are such as may be described on the rotating wormgear by rotating said profile on an axis approximately coinciding with the worm axis, said profile being offset from the center line of the worm gearing in the direction of decreasing profile inclination of the thread surface of the worm.

10. Enveloping worm gearing comprising a throated worm and a wormgear having a root surface of concave axial profile, each thread side of the worm having a working portion occupying the major part thereof and a relieved surface portion, said portions meeting in a near-ridge, the teeth of said wormgearing being inclined to the direction of its axis and having side surfaces of constant profile from end to end, such that said profile has a constant radial position and a constant inclination with respect to an axis offset from and angularly disposed to the axis of the rotating wormgear, said gearing having a mean path of contact inclined to the direction of the worm axis at an angle smaller than the mean inclination of the wormgear teeth to the wormgear axis.

11. Enveloping worm gearing according to claim 10, wherein said offset axis intersects the center line of the worm gearing.

12. Enveloping worm gearing comprising a throated worm and a wormgear having a root surface of concave axial profile, the teeth of said wormgear being inclined to the direction of its axis and having side surfaces whose inclination to said axis changes lengthwise of the teeth, each of said side surfaces being a surface of single configuration, the worm being formed conjugate to said wormgear to transmit uniform motion between them, each side of a worm thread containing a working portion of changing inclination to planes perpendicular to its axis and a relieved portion free of tooth contact in any actual running position, the mating wormgear tooth surface intersecting the extension of said working portion in a ridge offset from the center line of the worm gearing towards the side of decreasing inclination of the worm thread and that has an approximately constant position on the worm thread surface at changing turning angles.

References Cited in the file of this patent

UNITED STATES PATENTS

| | | |
|---|---|---|
| 1,792,782 | Trbojevich | Feb. 17, 1931 |
| 1,903,318 | Wildhaber | Apr. 4, 1933 |
| 2,069,433 | Wildhaber | Feb. 2, 1937 |
| 2,123,265 | Wattie | July 12, 1938 |
| 2,279,414 | Scott | Apr. 14, 1942 |
| 2,302,942 | Golber | Nov. 24, 1942 |
| 2,432,246 | Mackmann et al. | Dec. 9, 1947 |
| 2,619,845 | Mackmann et al. | Dec. 2, 1952 |
| 2,654,944 | Wilson | Oct. 13, 1953 |